(12) United States Patent
Cook et al.

(10) Patent No.: US 7,397,163 B2
(45) Date of Patent: Jul. 8, 2008

(54) POWER GENERATOR STATOR ASSEMBLY, A STATOR CORE MODULE ASSEMBLY, AND A PROCESS FOR ASSEMBLING A STATOR CORE MODULE ASSEMBLY WITHIN A STATOR FRAME

(75) Inventors: James A. Cook, Orlando, FL (US); David T. Allen, Longwood, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/506,079

(22) Filed: Aug. 17, 2006

(65) Prior Publication Data

US 2008/0042514 A1   Feb. 21, 2008

(51) Int. Cl.
  H02K 1/12   (2006.01)
  H02K 5/04   (2006.01)
  H02K 15/02  (2006.01)
(52) U.S. Cl. .................................. 310/258; 310/217
(58) Field of Classification Search ............... 310/52, 310/58, 89, 91, 217, 254, 258, 259
  See application file for complete search history.

(56) References Cited

U.S. PATENT DOCUMENTS

| | | | | |
|---|---|---|---|---|
| 3,652,889 | A * | 3/1972 | Reece et al. | 310/259 |
| 4,241,274 | A * | 12/1980 | Brammerlo | 310/259 |
| 4,425,523 | A * | 1/1984 | Detinko et al. | 310/258 |
| 4,485,320 | A * | 11/1984 | Kawada et al. | 310/217 |
| 4,536,671 | A * | 8/1985 | Miller | 310/258 |
| 4,564,779 | A * | 1/1986 | Terry, Jr. | 310/258 |
| 4,891,540 | A * | 1/1990 | Cooper et al. | 310/254 |
| 5,796,191 | A * | 8/1998 | Schwanda | 310/58 |
| 5,875,540 | A | 3/1999 | Sargeant et al. | |
| 6,104,116 | A * | 8/2000 | Fuller et al. | 310/217 |
| 6,448,686 | B1 * | 9/2002 | Dawson et al. | 310/254 |
| 6,462,457 | B2 * | 10/2002 | Shah et al. | 310/259 |
| 6,477,761 | B1 * | 11/2002 | Ohashi et al. | 29/596 |
| 6,597,081 | B2 * | 7/2003 | Dawson et al. | 310/258 |
| 6,628,027 | B2 * | 9/2003 | Fuller | 310/91 |
| 6,713,930 | B2 * | 3/2004 | Shah et al. | 310/216 |
| 6,720,699 | B1 * | 4/2004 | Shah et al. | 310/197 |
| 6,796,021 | B2 * | 9/2004 | Fuller | 29/732 |
| 6,979,930 | B2 * | 12/2005 | Harada et al. | 310/216 |
| 2003/0201689 | A1 * | 10/2003 | Shah et al. | 310/216 |
| 2005/0235479 | A1 | 10/2005 | Allen et al. | |
| 2005/0235480 | A1 * | 10/2005 | Majernik et al. | 29/596 |
| 2005/0236924 | A1 * | 10/2005 | Sargeant et al. | 310/217 |
| 2005/0236926 | A1 * | 10/2005 | Majernik et al. | 310/259 |

* cited by examiner

Primary Examiner—Tran Nguyen (57) ABSTRACT

A stator core module assembly (20) is provided which is adapted to be mounted to at least one structural element (16, 18) coupled to a stator frame (10). The stator core module assembly comprises a stator core module (22) adapted to form part of a stator core (21) and at least one keybar (32A, 32B) having a length less than a width of the stator core. The keybar may be coupled to the stator core module. The stator core module assembly further comprises at least one attachment member (34) for coupling the keybar to the structural element coupled to the stator frame.

20 Claims, 8 Drawing Sheets

POWER GENERATOR STATOR ASSEMBLY, A STATOR CORE MODULE ASSEMBLY, AND A PROCESS FOR ASSEMBLING A STATOR CORE MODULE ASSEMBLY WITHIN A STATOR FRAME

BACKGROUND OF THE INVENTION

1. Field of the Invention

This invention relates in general to a power generator stator assembly, a stator core module assembly, and a process for assembling a stator core module assembly within a horizontally positioned stator frame.

2. Background Information

U.S. Pat. No. 6,104,116 discloses a technique for mounting a power generator stator core to a stator frame. A plurality of keybars are provided, which engage corresponding slots provided in the stator core. One or more spring bars are welded to the stator frame. Keyblocks are bolted to the keybars and provide a means for mounting the keybars to the spring bars. The keybars are shown extending along the entire length of the stator core.

U.S. Pat. No. 5,875,540 discloses a process for forming a stator core in a stator frame. The process involves forming a plurality of core modules or donuts, each of which comprises a plurality of stator core rings or plates. The stator frame is placed in an upright position. A predefined number of the core modules are then lowered into the upright stator frame. For a power generator which has been in operation for some time and is in need of a new stator core, turning its stator frame upright to receive a new stator core is very difficult arid typically not feasible.

An improved technique for assembling a stator core within a stator frame is desired, especially when the stator frame comprises a horizontally positioned housing.

SUMMARY OF THE INVENTION

In accordance with a first aspect of the present invention, a generator stator assembly is provided comprising a stator frame; a structural element coupled to the stator frame; a stator core including at least one stator core module; a keybar having a length less than a width of the stator core and being coupled to the stator core module; and an attachment member for coupling the keybar to the structural element coupled to the stator frame.

The structural element coupled to the stator frame may comprise a spring bar coupled to the stator frame.

First and second stator core modules may be provided.

A pair of first keybars may be provided. Each of the first keybars may have a length substantially equal to or less than a width of the first stator core module and is coupled to the first stator core module. Each of the first keybars may also be coupled to a corresponding one of first and second ends of the attachment member.

The attachment member may include a recess for receiving the structural element coupled to the stator frame. The recess may be position between the first and second ends of the attachment member.

Each keybar may be coupled to a stator core module by fitting into a slot in the stator core module and being held in the slot by friction.

In accordance with a second aspect of the present invention, a stator core module assembly is provided which is adapted to be mounted to at least one structural element coupled to a stator frame. The stator core module assembly comprises a stator core module adapted to form part of a stator core and at least one keybar having a length less than a width of the stator core. The keybar may be coupled to the stator core module. The stator core module assembly further comprises at least one attachment member for coupling the keybar to the structural element coupled to the stator frame.

A pair of first keybars may be provided. Each of the first keybars may have a length substantially equal to or less than a width of the stator core module. The first keybars may be coupled to the stator core module and the attachment member.

The attachment member may include a recess for receiving the structural element coupled to the stator frame. The recess may be positioned between the first and second ends of the attachment member.

First and second attachment members may be provided. The first keybars may be coupled to the first attachment member.

A pair of second keybars may also be provided. Each of the second keybars may have a length substantially equal to or less than a width of the stator core module and may be coupled to the stator core module. The second keybars may also be coupled to the second attachment member.

Each of the first keybars may be coupled to a corresponding one of first and second ends of the first attachment member and each of the second keybars may be coupled to a corresponding one of first and second ends of the second attachment member.

In accordance with a third aspect of the present invention, a process is provided for mounting a stator core module assembly to a structural element coupled to a generally horizontally positioned stator frame. The process comprises providing a stator core module for use in forming a stator core, coupling at least one keybar to the stator core module and coupling an attachment member to the at least one keybar. The keybar may have a length less than a width of the stator core. The stator core module, the attachment member and the keybar define a stator core module assembly. The process further comprises mounting the stator core module assembly to the structural element coupled to the generally horizontally positioned stator frame.

Coupling at least one keybar to the stator core module may comprise coupling a pair of keybars to the stator core module.

Coupling an attachment member to the at least one keybar may comprise coupling a first end of the attachment member to one of the pair of keybars and a second end of the attachment member to the other of the pair of keybars.

Mounting the stator core module assembly to the structural element coupled to the generally horizontally positioned stator frame may comprise positioning the stator core module assembly such that a recess provided in the attachment member receives the structural element.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
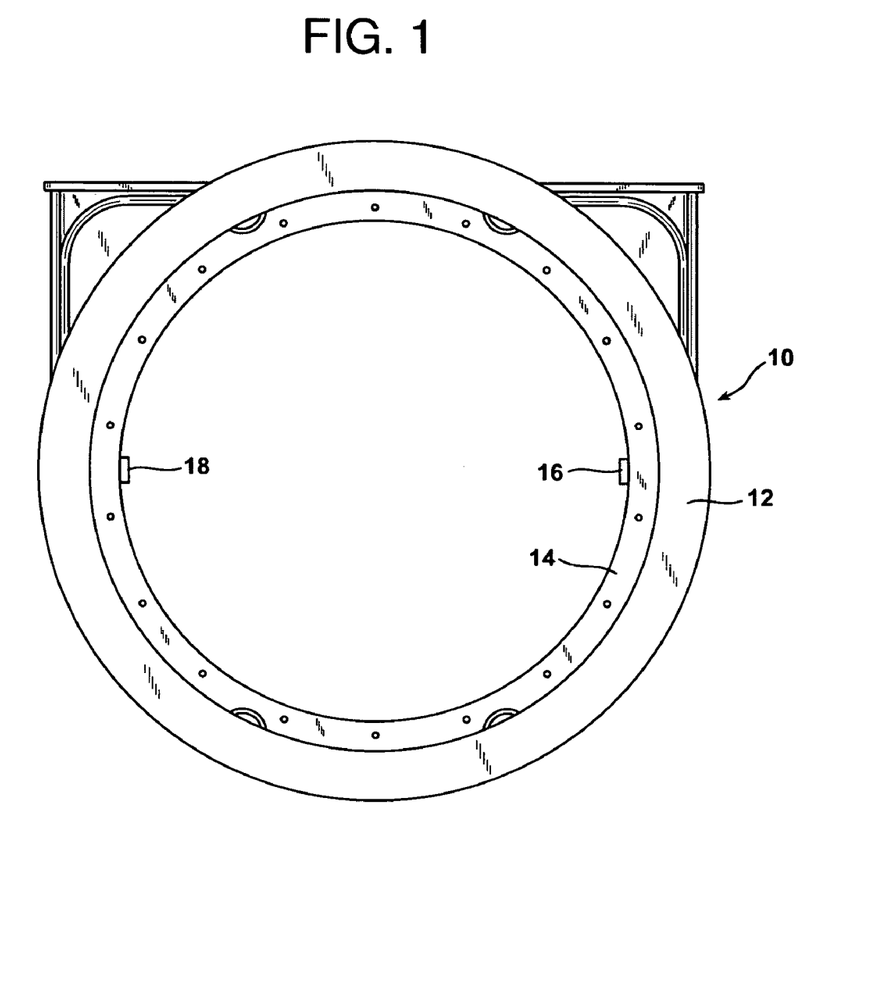
FIG. 1 is an end view of a stator frame constructed in accordance with the present invention.
Figure 2:
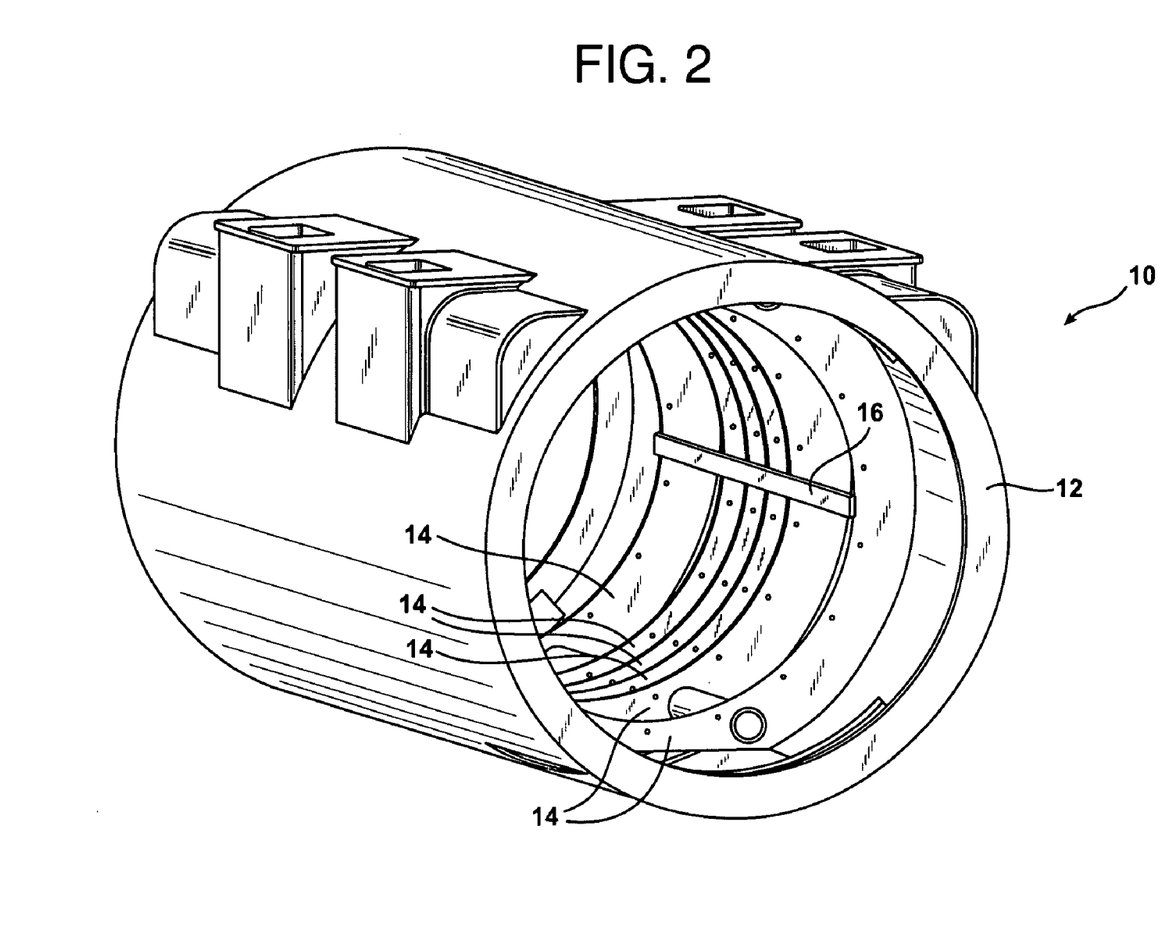
FIG. 2 is a perspective view of the stator frame illustrated in FIG. 1.

Referring now to FIGS. 1 and 2, a stator frame 10, adapted to form part of an electrical machine, such as a power generator, is illustrated. The stator frame 10 comprises a generally cylindrical main housing 12 and a plurality of support rings 14. The main housing 12 is fixed to a static support (not shown), such as a floor of a power plant. The plurality of support rings 14 are provided within the main housing 12 and, in the illustrated embodiment, are welded directly to the main housing 12. First and second axial spring bars 16 and 18 are welded to the support rings 14. The first and second spring bars 16 and 18 are spaced apart from one another by about 180 degrees and extend almost the entire length of the stator frame 10, see FIGS. 1 and 2. It is contemplated that more than two spring bars could be provided. The spring bars 16 and 18 support the weight of a stator core, which, as will be discussed further below, comprises a plurality of stator core module assemblies 20, e.g., from about 20 to about 50 stator core module assemblies 20.

Figure 3:
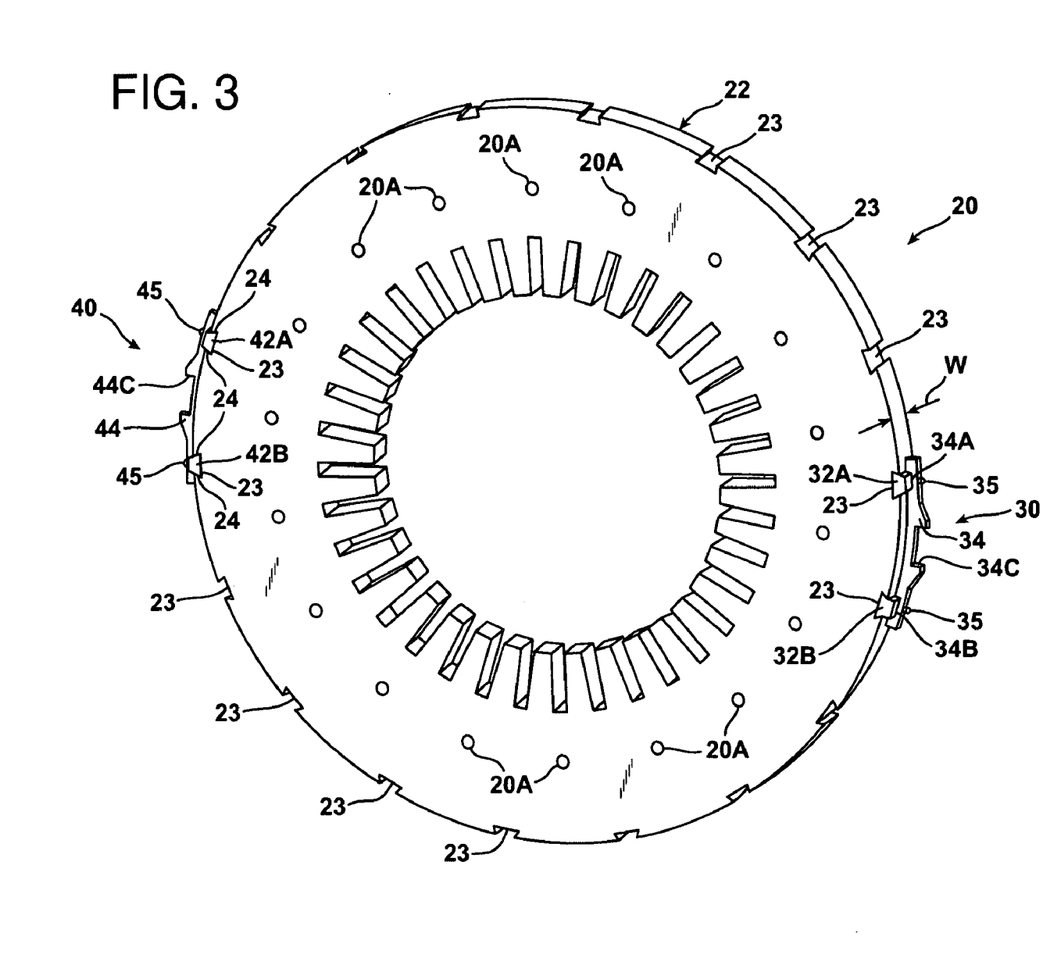
FIG. 3 is a perspective view of a stator core module assembly constructed in accordance with the present invention.
Figure 4:
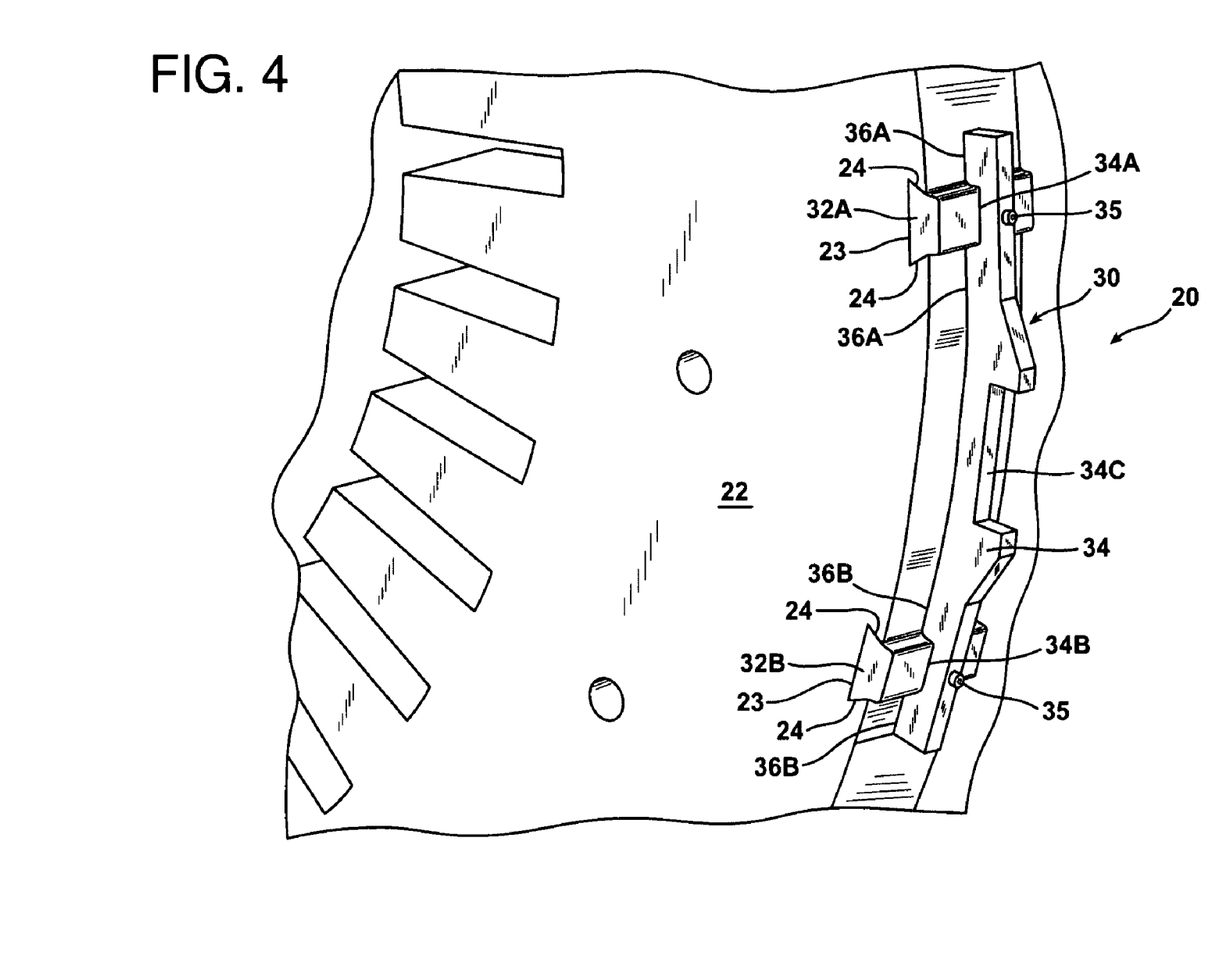
FIG. 4 is an enlarged view of a keybar/attachment member assembly of the stator core module assembly illustrated in FIG. 3.

A stator core module assembly 20 is illustrated in FIGS. 3 and 4. It comprises a stator core module 22 comprising a plurality of stator core rings, which are laminated together. A process for laminating a plurality of rings to one another so as to form a stator core module is disclosed in U.S. Pat. No. 5,875,540, the entire disclosure of which is incorporated by referenced herein. A plurality of keybar slots 23 are formed in the core module 22, see FIG. 3.

Figure 4A:
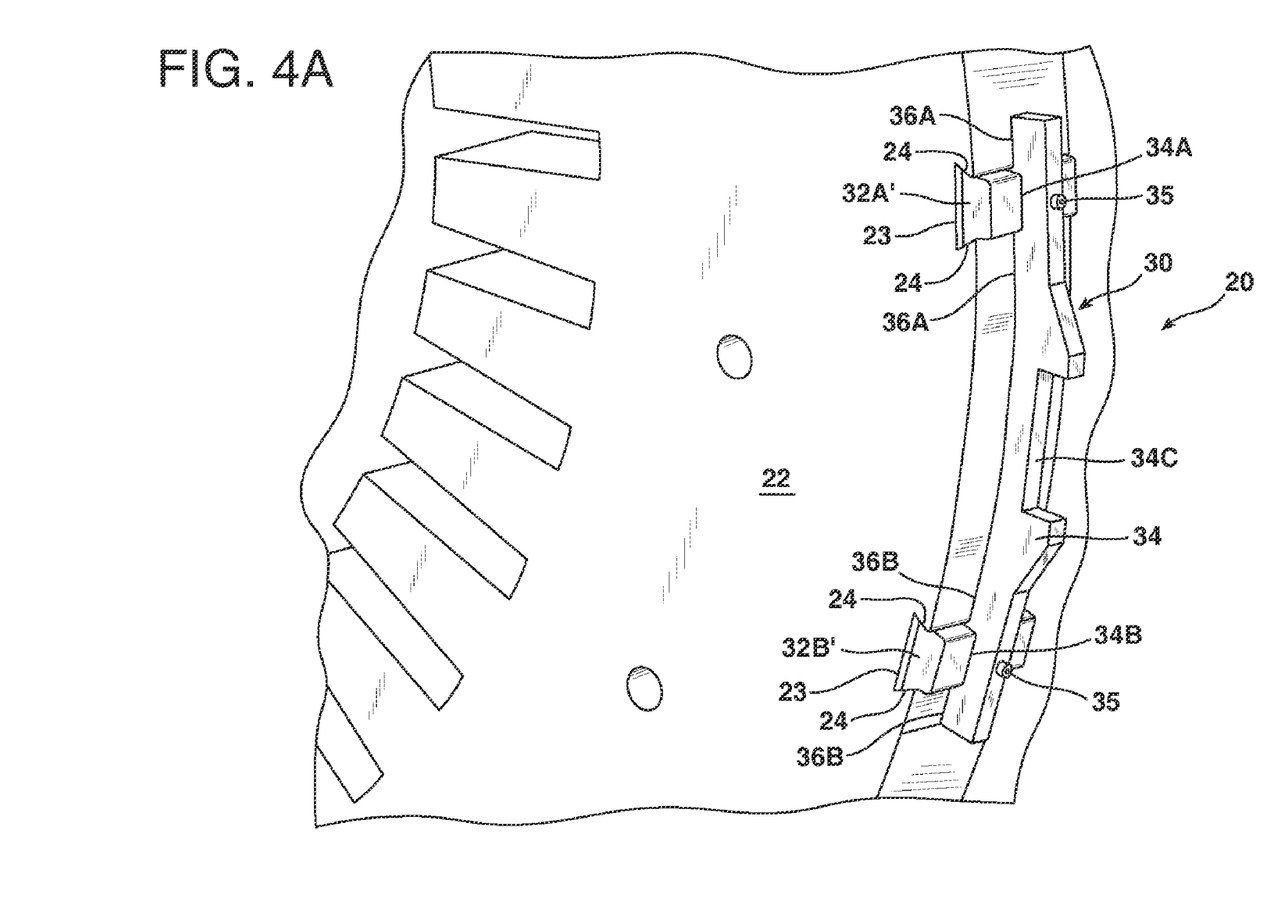
FIG. 4A is an enlarged view of a modified keybar/attachment member assembly of a stator core module assembly.
Figure 5:
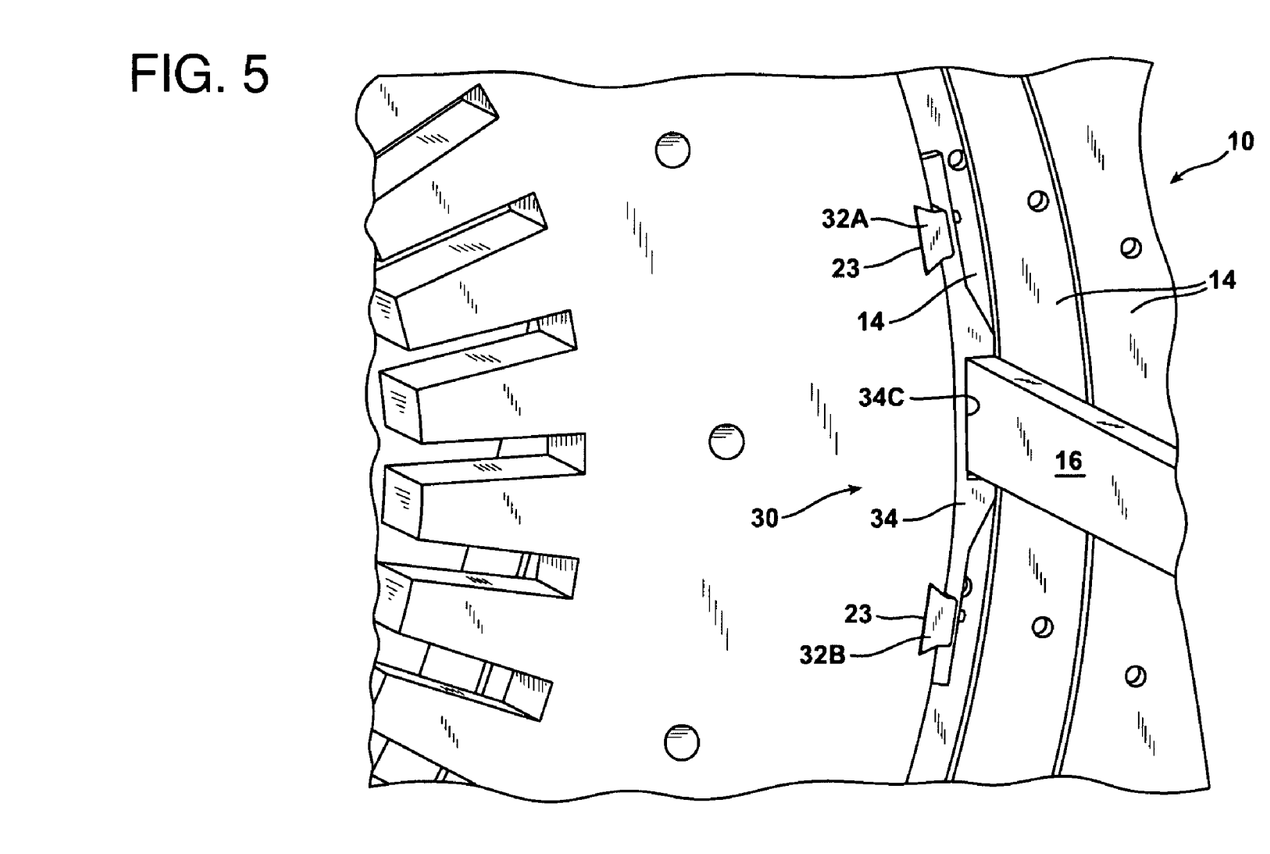
FIG. 5 is an enlarged view of a keybar/attachment member assembly mounted to a spring bar.
Figure 6:
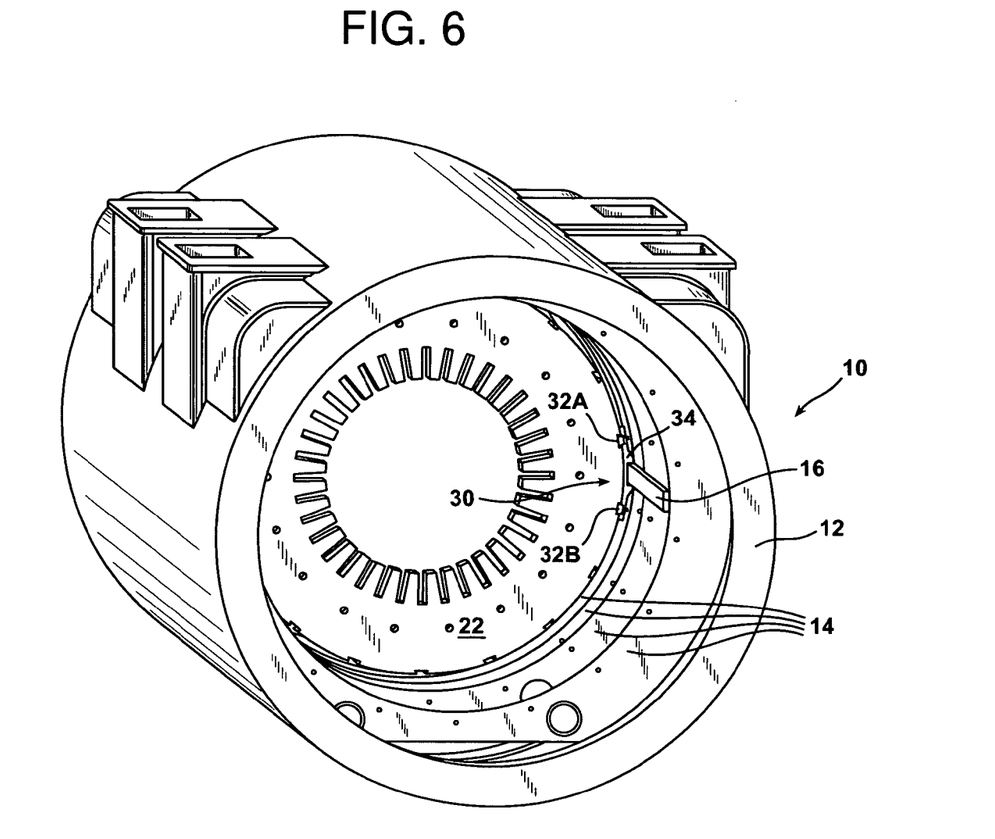
FIG. 6 is a perspective view of the stator frame with a stator core module assembly mounted therein.

The stator core module assembly 20 further comprises first and second keybar/attachment member assemblies 30 and 40. The first assembly 30 comprises a pair of shortened first keybars 32A and 32B, see FIGS. 3 and 4, each of which has a length substantially equal to a width W of one stator core module 22. The first keybars 32A and 32B are received in a corresponding keybar slot 23 in the core module 22 and held therein via friction. The first assembly 30 further comprises a first attachment member 34. The first attachment member 34 includes a pair of first keybar recesses 34A and 34B, which are adapted to receive a corresponding one of the first keybars 32A and 32B. The attachment member 34 is coupled to the first keybars 32A and 32B via screws 35. The keybar recesses 34A and 34B have a sufficient depth and lower end surfaces 36A and 36B of the attachment member 34 are shaped so that as the screws 35 are tightened, the keybars 32A and 32B are pulled radially outward so as to tightly engage slot upper surfaces 24 in the module 22, thereby further increasing the frictional engagement between the module 22 and the keybars 32A and 32B. The first attachment member 34 further includes a recess 34C, which, in the illustrated embodiment, is centrally located in the attachment member 34. In FIG. 4A, the keybars 32A' and 32B' have a length less than the width of the slots 23.

The second keybar/attachment member assembly 40 is constructed in essentially the same manner as the first assembly 30. The second keybar/attachment member assembly 40 comprises a pair of shortened second keybars 42A and 42B, each of which has a length substantially equal to the width W of the stator core module 22, see FIG. 3. The second keybars 42A and 42B are received in a corresponding keybar slot 23 in the core module 22 and held therein via friction. The second assembly 40 further comprises a second attachment member 44. The second attachment member 44 includes second keybar recesses, which are adapted to receive a corresponding one of the second keybars 42A and 42B. The attachment member 44 is coupled to the second keybars 42A and 42B via screws 45. The keybar recesses in the attachment member 44 have a sufficient depth and lower end surfaces of the attachment member 44 are shaped so that as the screws 45 are tightened, the keybars 42A and 42B are pulled radially outward so as to tightly engage slot upper surfaces 24 in the module 22, thereby increasing the frictional engagement between the module 22 and the keybars 42A and 42B. The second attachment member 44 further includes a recess 44C, which, in the illustrated embodiment, is centrally located in the attachment member 44.

Figure 7:
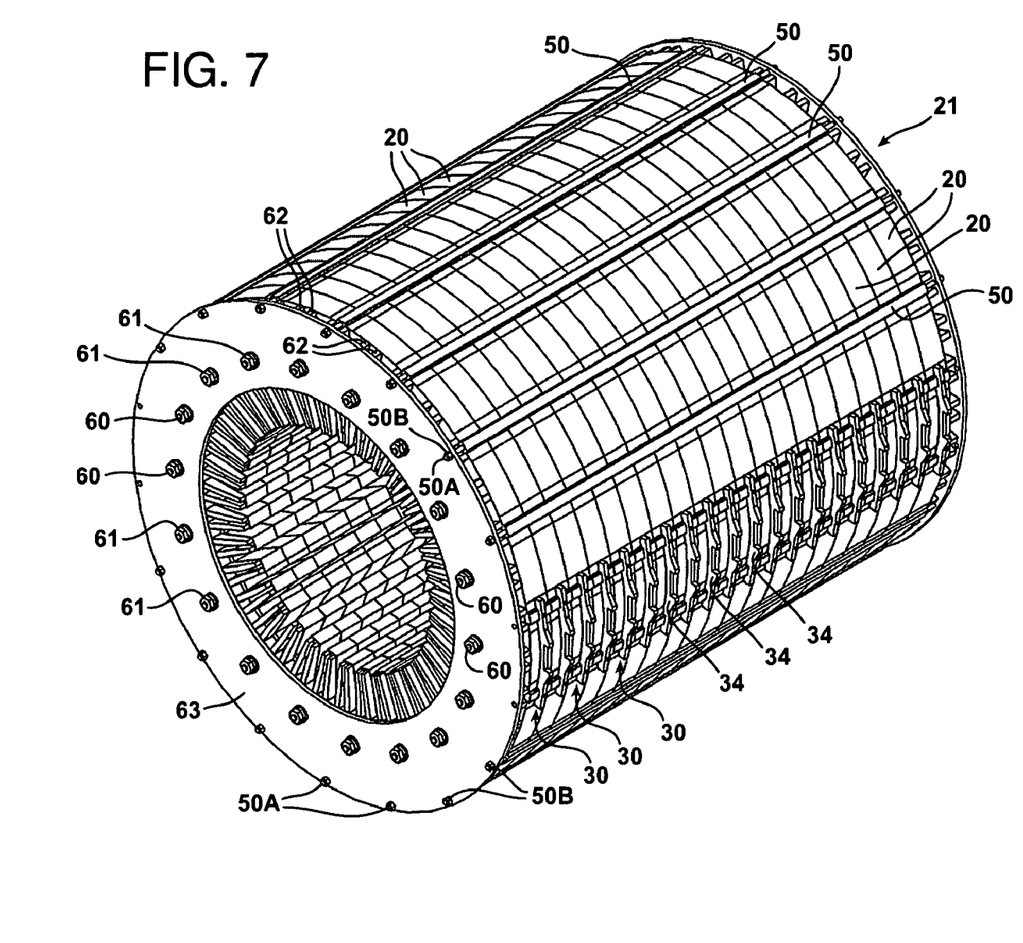
FIG. 7 is a perspective view of a stator core formed from a plurality of the stator core module assemblies illustrated in FIG. 3 and wherein the stator frame is not shown.

In the illustrated embodiment, a stator core is constructed within the stator frame 10 while the main housing 12 of the frame 10 is in a horizontal position. Hence, in accordance with the present invention, a replacement stator core can be readily assembled within an existing horizontally positioned stator frame 10. The stator core 21, see FIG. 7, is constructed from a plurality of the stator core module assemblies 20. As noted above, between about 20 to about 50 stator core module assemblies 20 may be provided to form a single stator core within the housing 12. Each stator core module assembly 20 may be inserted into the horizontally positioned stator frame 10 by aligning the recesses 34C and 44C in the first and second attachment members 34 and 44 with the first and second spring bars 16 and 18 welded to the stator housing support rings 14. Preferably, the recesses 34C and 44C are slightly oversized so as to allow easy movement of each stator core module assembly 20 along the spring bars 16 and 18. Once each stator core module assembly 20 is properly positioned and located within the housing 12, wedges (not shown) may be inserted into the recesses 34C and 44C to frictionally clamp or lock the attachment members 34 and 44 to the spring bars 16 and 18. It is also contemplated that the attachment members 34 and 44 may be welded, bolted or otherwise coupled to the spring bars 16 and 18.

The core module assemblies 20 may be horizontally moved into the stator frame 10 via the central rail structure and dolly disclosed in U.S. Published Application US 2005/0236926 A1, the entire disclosure of which is incorporated by reference herein. It is also contemplated that the core module assemblies 20 may be horizontally moved into the stator frame 10 via the rail structure and dolly disclosed in U.S. Published Application US 2005/0235480 A1, the entire disclosure of which is incorporated by reference herein. However, the rails on which the rail structure, disclosed in U.S. Published Application US 2005/0235480 A1, moves preferably comprise a different and smaller cross section than that of the slots 23 in the core module assemblies 20 so as to allow ease of movement of the core module assemblies 20 along the rails. Further, the rails do not comprise permanent keybars. For example, the rails could have a cylindrical shape and be temporarily mounted to the support rings 14 of the stator frame 10.

After all the core module assemblies 20 have been mounted within the stator frame 10, a plurality of long keybars 50 are inserted into the slots 23 of the assemblies 20 not containing a short keybar. A completed stator core 21, as it would look after being assembled within a stator frame 10, is illustrated in FIG. 7. However, the stator frame 10 is not shown in FIG. 7. The long keybars 50 have a length substantially equal to the overall width of the assembled stator core 21, wherein the width of the stator core 21 is defined by at least the combined widths of all of the core module assemblies 20 mounted within the stator frame 10. A threaded stud 50A extends outwardly from each end of the keybars 50, see U.S. Pat. No. 6,104,116, the entire disclosure of which is incorporated herein by reference. An end plate 63 and a finger plate 62 may be positioned adjacent each end of the combined core module assemblies 20. The threaded studs 50A extend through the end and finger plates 63 and 62, see FIG. 7. Threaded nuts 50B engage the threaded studs 50A so as to couple the end and finger plates 63 and 62 to the combined core module assemblies 20.

A plurality of through bolts 60 extend through openings 20A in the stator core module assemblies 20, and openings in the end and finger plates 60 and 62, see FIGS. 2, 3 and 7. Nuts 61 are coupled to opposing ends of the through bolts 60 so as to compress the stator core module assemblies 20 together and further couple the end and finger plates 60 and 62 to the combined core module assemblies 20.

While in the illustrated embodiment, the shortened keybars 32A, 32B, 42A, 42B have a length substantially equal to a width of one stator core module 22, it is contemplated that each shortened keybar may have any length less than the overall width of the stator core 21. For example, the shortened keybars may have a length substantially equal to the width of two stator core modules 22 so as to engage corresponding recesses in the two modules 22. It is further contemplated that if two or more stator core modules 22 have different widths, the shortened keybars may have a length substantially equal to the width of its corresponding stator core module 22.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A generator stator assembly comprising:
   a stator frame;
   a structural element coupled to said stator frame;
   a stator core including at least one stator core module;
   a keybar having a length less than a width of said stator core and being coupled to said stator core module; and
   an attachment member for coupling said keybar to said structural element coupled to said stator frame.

2. A generator stator assembly as set out in claim 1, wherein said structural element coupled to said stator frame comprises a spring bar coupled to said stator frame.

3. A generator stator assembly as set out in claim 1, wherein said keybar has a length substantially equal to or less than a width of said stator core module and is coupled to said stator core module.

4. A generator stator assembly as set out in claim 1, wherein said at least one stator core module comprises at least first and second stator core modules.

5. A generator stator assembly as set out in claim 4, wherein said at least one keybar comprises a pair of first keybars, each of said first keybars having a length substantially equal to or less than a width of said first stator core module and being coupled to said first stator core module.

6. A generator stator assembly as set out in claim 5, wherein each of said pair of first keybars is coupled to a corresponding one of first and second ends of said attachment member.

7. A generator stator assembly as set out in claim 6, wherein said attachment member includes a recess for receiving said structural element coupled to said stator frame, said recess being positioned between said first and second ends of said attachment member.

8. A generator stator assembly as set out in claim 1, wherein said keybar is coupled to said stator core module by fitting into a slot in said stator core module and being held in said slot by friction.

9. A stator core module assembly adapted to be mounted to at least one structural element coupled to a stator frame comprising:
   a stator core module adapted to form part of a stator core;
   at least one keybar having a length less than a width of the stator core and being coupled to said stator core module; and
   at least one attachment member for coupling said keybar to the structural element coupled to the stator frame.

10. A stator core module assembly as set out in claim 9, wherein said at least one keybar comprises a pair of first keybars, each of said pair of first keybars having a length substantially equal to or less than a width of said stator core module and being coupled to said stator core module.

11. A stator core module assembly as set out in claim 10, wherein each of said pair of first keybars is coupled to a corresponding one of first and second ends of said attachment member.

12. A stator core module assembly as set out in claim 11, wherein said attachment member includes a recess for receiving the structural element coupled to the stator frame, said recess being positioned between said first and second ends of said attachment member.

13. A stator core module assembly as set out in claim 10, wherein said at least one attachment member comprises first and second attachment members, said pair of first keybars being coupled to said first attachment member.

14. A stator core module assembly as set out in claim 13, wherein said at least one keybar further comprises a pair of second keybars, each of said pair of second keybars having a length substantially equal to or less than a width of said stator core module and being coupled to said stator core module, said pair of second keybars also being coupled to said second attachment member.

15. A stator core module assembly as set out in claim 14, wherein each of said pair of first keybars is coupled to a corresponding one of first and second ends of said first attachment member and each of said pair of second keybars is coupled to a corresponding one of first and second ends of said second attachment member.

16. A generator stator assembly as set out in claim 9, wherein said keybar is coupled to said stator core module by fitting into a slot in said stator core module and being held in said slot by friction.

17. A process for mounting a stator core module assembly to a structural element coupled to a generally horizontally positioned stator frame comprising:

providing a stator core module adapted to form part of a stator core;

coupling at least one keybar to said stator core module, said keybar having a length less than a width of the stator core;

coupling an attachment member to said at least one keybar, said stator core module, said attachment member and said keybar defining a stator core module assembly; and mounting said stator core module assembly to the structural element coupled to the generally horizontally positioned stator frame.

18. The process as set forth in claim 17, wherein coupling at least one keybar to said stator core module comprises coupling a pair of keybars to said stator core module.

19. The process as set forth in claim 18, wherein coupling an attachment member to said at least one keybar comprises coupling a first end of said attachment member to one of said pair of keybars and a second end of said attachment member to the other of said pair of keybars.

20. The process as set forth in claim 17, wherein mounting said stator core module assembly to the structural element coupled to the generally horizontally positioned stator frame comprising positioning said stator core module assembly such that a recess provided in said attachment member receives the structural element coupled to the generally horizontally positioned stator frame.

* * * * *